A. CARLSEN.
APPARATUS FOR PRODUCING DRIVING BELTS.
APPLICATION FILED NOV. 2, 1917.
1,346,700.
Patented July 13, 1920.
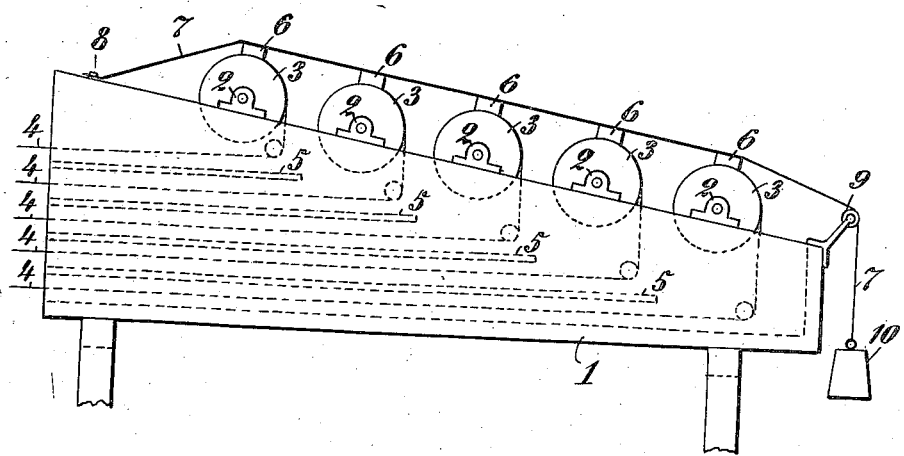
Inventor
Axel Carlsen
BY
ATTORNEYS

UNITED STATES PATENT OFFICE.

AXEL CARLSEN, OF LYNGBY, NEAR COPENHAGEN, DENMARK.

APPARATUS FOR PRODUCING DRIVING-BELTS.

1,346,700.

Specification of Letters Patent.  Patented July 13, 1920.

Application filed November 2, 1917. Serial No. 199,855.

*To all whom it may concern:*

Be it known that I, AXEL CARLSEN, engineer and factory manager, of Lyngby, near Copenhagen, Denmark, have invented a new and Improved Apparatus for Producing Driving-Belts, of which the following is a full, clear, and exact description.

The object of my invention is to use cross-woven linen tracks, i. e. linen in which all the threads run diagonally and all end in the edges, which by a special gluing machine are glued together in more plies, and my invention aims at making such gluing possible without folds appearing in the plies and without the one layer being more strained than the other.

The object of my invention is also to secure an even strain on all the plies which is of the greatest importance to the strength of the finished product, and this is made by exposing every ply of the textile fabric to so strong a drawing or stretching, that it has stretched so much, as it is necessary with regard to the finished product.

By using diagonally woven linen it is attained, that the belt does not fray in the edges, that its strength is highly increased, and that the belt is not destroyed by running on small pulleys, which, as it will be known, belts of known kind, which are glued together, do not stand well.

However, by the known machines for gluing textile belts it is not possible to glue layers of diagonally woven linen, because owing to these stretching themselves much more than common fabric, special arrangements must be made in order to take the stretching from the linen layers, and in order to secure, that the layers do not pucker or deviate in running.

The invention is shown on the inclosed drawing, which shows a side view of a part of a machine for gluing layers of diagonally woven linen in long lengths, in vertical longitudinal section.

1 is the machine frame with bearings 2 for the rollers 3, upon which the diagonally woven linen tracks are rolled. In the trough applied in the machine frame are horizontal walls 5, by which are formed a series of canals through which the linen tracks are led, so that it is avoided, that they touch each other.

The walls 5 may consist of wire hurdle-work, wooden plates or the

As stated it is of the greatest importance by the use of diagonally woven linen in more layers that they are glued together under exactly the same tension, so that all the layers are caused to partake in the drawing with the same part of the whole drawing pull.

This is sought to be attained by using a braking arrangement consisting of blocks 6, resting on the upper side of each linen cylinder 3, which blocks best may have same breadth as the linen.

Over all the blocks are applied two or more bands 7, which are fastened in the one end 8, and in the other goes over a roller 9 and bear a weight 10 or eventually an adjustable spring.

By this weight or spring it may be possible to exercise a constant and quite equal braking strain on all the rollers, so that all the linen layers are exposed to the same tension.

After having described my invention I claim and desire to secure by Letters Patent:

1. In an apparatus of the character described, the combination with a trough, of a plurality of rollers mounted on the trough and upon each of which a material is adapted to be wound, and a brake common to all of the rollers, said brake comprising a flexible member extending above and over all of the rollers and having brake blocks on its inner face engaging the upper sides of the rollers, said flexible member having one end fixed and provided with a tension device at its other end.

2. In an apparatus of the character described, the combination with a trough, of a plurality of rollers mounted on the trough and upon which are adapted to be wound diagonally woven textile fabrics for forming a belt, and a brake common to all of the rollers, said brake comprising a plurality of flexibly connected and yieldingly supported brake blocks above the rollers and engaging the upper sides of the same.

Signed by me at Copenhagen, Denmark this 14th day of September, 1917.

AXEL CARLSEN.

Witnesses:
 CHARLES UNCH,
 ABBA HAUN.